United States Patent [19]

Elder

[11] Patent Number: 5,454,357
[45] Date of Patent: Oct. 3, 1995

[54] SLIDE PORT VALVE FOR AN INTERNAL COMBUSTION ENGINE

[75] Inventor: Jack E. Elder, Rochester, Mich.

[73] Assignee: General Motors Corporation, Detroit, Mich.

[21] Appl. No.: 355,076

[22] Filed: Dec. 12, 1994

[51] Int. Cl.⁶ ............................. F02D 9/08; F02B 15/00
[52] U.S. Cl. .................... 123/337; 123/184.55; 123/432; 123/188.14; 251/212
[58] Field of Search .................................. 123/432, 308, 123/188.14, 336, 184.55; 251/212

[56] References Cited

U.S. PATENT DOCUMENTS

| | | | |
|---|---|---|---|
| 4,064,857 | 12/1977 | Williams | 123/337 |
| 4,531,539 | 7/1985 | Jandrasi et al. | 251/212 |
| 4,651,693 | 3/1987 | Nakajima et al. | 123/306 |
| 4,932,369 | 6/1990 | Parr | 123/52 MB |
| 5,005,532 | 4/1991 | Shillington | 123/52 M |
| 5,105,774 | 4/1992 | Piccini | 123/52 MB |
| 5,143,026 | 9/1992 | Brustle et al. | 123/52 MB |
| 5,156,115 | 10/1992 | Scherenberg | 123/52 MB |
| 5,211,139 | 5/1993 | Houles | 123/184.55 |
| 5,251,591 | 10/1993 | Corrin | 123/337 |

FOREIGN PATENT DOCUMENTS

| | | | |
|---|---|---|---|
| 2714933 | 10/1978 | Germany | 251/212 |
| 3199632 | 8/1991 | Japan | 123/337 |

Primary Examiner—Henry C. Yuen
Assistant Examiner—Erick Solis
Attorney, Agent, or Firm—Karl F. Barr, Jr.

[57] ABSTRACT

A port throttle valve and an intake system incorporating the valve is disclosed. The valve is disposed between one of two intake runners delivering air to the intake port of an engine cylinder and includes a base member having an opening for delivery of air therethrough. The base includes a track in which is slidingly disposed, two adjacent valve plates each having an opening for registry with the opening in the base member to allow for the passage of air. When moved, in opposite longitudinal directions, the edges of the openings in the valve members move towards one another to terminate registry of the openings with the opening in the valve body.

7 Claims, 7 Drawing Sheets

SLIDE PORT VALVE FOR AN INTERNAL COMBUSTION ENGINE

TECHNICAL FIELD

The invention relates to intake systems for internal combustion engines and, more particularly, to such systems utilizing a sliding port valve for regulation of intake air to individual engine cylinders.

BACKGROUND

In some internal combustion engines it may be desirable to vary the intake runner length, during operation, in order to optimize engine performance characteristics across a wide range. Runner variation may be achieved through the use of an intake manifold having two intake runners, of varying length, associated with each engine cylinder. The intake runners are valved into and out of communication with respective cylinders, based on engine parameters, using a valve system disposed between the runners and the engine. In such systems it would be desirable to avoid disruption of the inlet flow caused by turbulence in the inlet runners while minimizing the complexity of the valving system.

Port throttle valves typically used to regulate air flow to an internal combustion engine are "butterfly" valves composed of a body having a throat across which is a diametrically extending, rotatable shaft with a valve plate attached thereto. Butterfly valves are constructed from a multiplicity of parts which are, by design, difficult to assemble and calibrate. Clearances required for assembly of the many components assure that close tolerances are difficult to achieve and, as such, a fully sealing valve is unlikely.

It is known to use slide valves as an alternative to butterfly valves in intake systems for the control of intake air. Such slide valves have advantages over butterfly valves including a simplification of, and reduction in the number of parts required to assemble a valve, elimination of the flow disrupting center shaft in the air stream and greatly improved sealing characteristics of the valve member. Disadvantages of such valves have been in their propensity to stick or bind due to contaminant build-up, space requirements-for the movement of the valve plate, and non-uniformity of flow through the valve under less than full flow conditions as a result of side-to-side valve movement.

SUMMARY OF THE INVENTION

The disclosed invention provides an improved slide valve for use in regulating air flow through the intake system of an internal combustion engine. Additionally, a novel application of the disclosed slide valve to an intake system having speed dependent, variable length, intake runners is shown.

In an internal combustion engine system according to the present invention, an intake system, including an intake manifold, delivers a fuel/air mixture to the cylinders of the engine. The intake manifold has individual intake runners, associated with each engine cylinder, through which air is admitted. Two runners of varying length are available to supply air to each engine cylinder based on engine operating parameters. At low speed, for instance, it may be desirable to supply engine air exclusively through a relatively long, tuned runner while at higher engine speeds intake air is supplied through a runner having a shorter length or, alternately, through both short and long runners simultaneously. In a preferred embodiment of the present invention, both runners supply the engine with intake air throughout a portion of the engine operating range.

Disposed between the intake manifold and the engine cylinders, preferably at the intake manifold—cylinder head interface, is a slide valve assembly having openings through which intake air can flow when the valve is open. The valve mechanism is closeable to preclude the flow of air through at least one of the intake runners assigned to each cylinder. The slide valve assembly comprises a base member configured for insertion between the intake manifold and the cylinder head. The base member houses two, slidable valve plates which include longitudinally spaced openings. The valve plates are moveable in the base such that the openings can be brought into registry with one another and with respective intake runners to allow air flow through the runners, the valve assembly, and to the engine cylinders. Alternately, the slidable valve plates can be moved out of alignment with each other, and the respective intake runners, to block the flow of air therethrough. An actuator, integral with base member, functions to move the valve plates and, thereby, regulate the flow of air to the engine.

It is desirable, when adding the air flow of a second intake runner to the air flow already entering the cylinder inlet, to minimize the disruption of the established air flow. By providing a stable transition, air flow remains smooth, thereby minimizing disruption of the fueling event. The slide valve assembly disclosed herein, employs valve plates which move directionally opposite to one another during operation. When closed, the axially spaced openings in each valve plate lie in axially offset, or opposite directions from one another. Opening operation of the actuator moves the valve plates in opposed directions such that the oppositely offset openings are moved axially towards one another and into registry. The result of the offset valve configuration is a centrally opening valve unit providing a stable transition of air flow when an additional intake runner is brought on line or turned off, as the case may be. An additional feature of the offset valve configuration is that valve plate movement is limited to one-half the length of the intake runner cross-section. The advantageous result of the limited valve plate movent is a faster opening and closing response and, a shorter end length or overhang than would be required should the valve plate move the entire cross-sectional length of the intake runner opening.

These and other features, objects, and advantages of the invention will be more apparent by reference to the following description and to the drawings.

DESCRIPTION OF THE PREFERRED EMBODIMENTS

Figure 1:
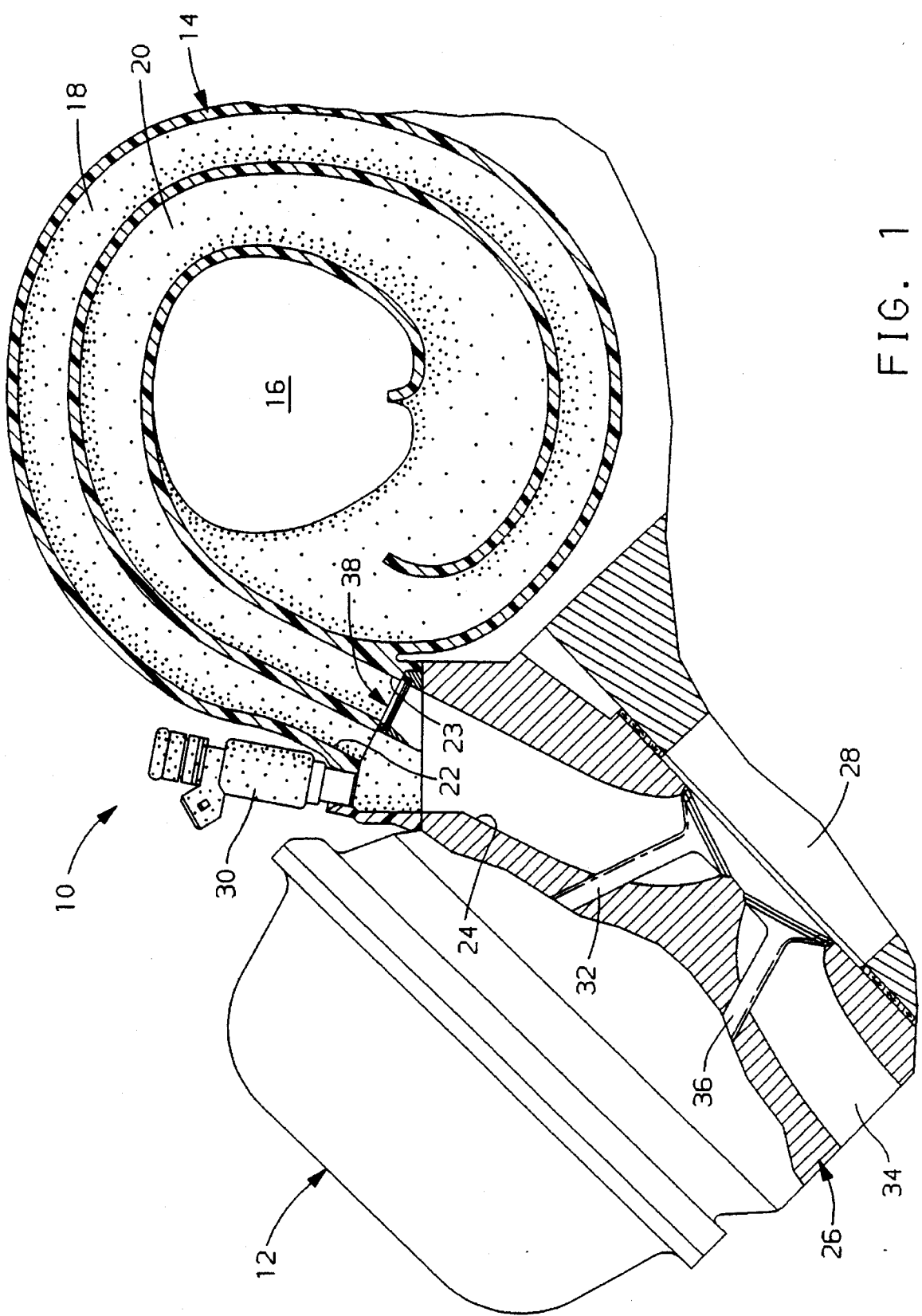
FIG. 1 is a partial, sectional view of an intake system for an internal combustion engine incorporating features of the present invention.

In FIG. 1 there is illustrated an intake system, designated generally as 10, of an internal combustion engine 12. The intake system includes an intake manifold 14 having a longitudinally extending, air distribution chamber 16 which operates to supply intake air to a series of tuned intake runners 18 and 20. The intake runners 18 and 20 are radially nested, relative to one another and extend circumferentially about the distribution chamber to terminate at outlets 22 and 23. The result of nesting the runners is that runner 18 is longer than runner 20. The intake manifold is mounted to the engine 12 such that the outlets 22,23 align with intake port 24 in the engine head 26. The inlet port conducts air exiting the runner outlets 22,23 in manifold 14 to the cylinder 28 for combustion. As the air transits inlet port 24, a fuel injector 30 meters fuel into the air stream to form a combustible mixture. A reciprocably operable valve member 32 regulates the flow of fuel and air into the cylinder 28 and, likewise, combustion gases exit the cylinder through exhaust port 34 upon opening of exhaust valve member 36.

As indicated, intake runners 18 and 20 are in flow communication with a cylinder 28. Each cylinder in the engine 12 is similarly equipped with two intake manifold runners of unequal length which are supplied air for combustion from chamber 16. As the cross section of FIG. 1 shows, the runners 18 and 20 are disposed, due to nesting, in a "top/bottom" arrangement with respect to one another. As a result of the top/bottom configuration, significant savings can be recognized in longitudinal intake manifold length when compared with comparable side-by-side arrangements.

Figure 7:
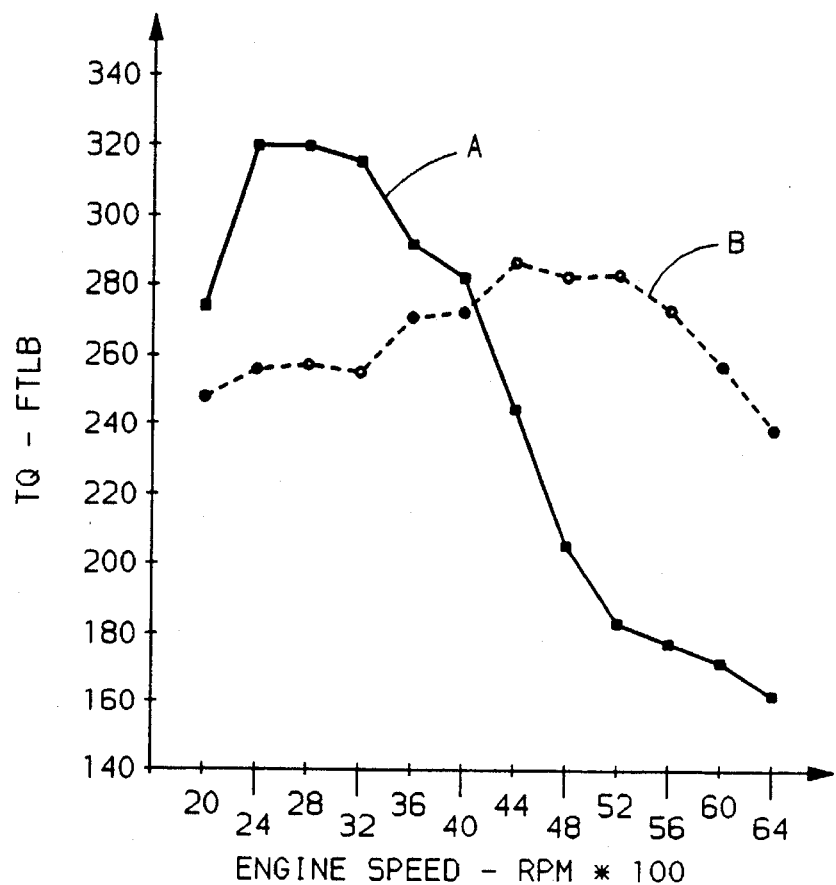
FIG. 7 is a diagram illustrating the relationship of torque and engine speed for various intake system configurations.

The benefit of two, different length intake runners for each engine cylinder can be seen in the graph of FIG. 7 which compares torque at a given engine speed for an engine "A" having a single length intake runner and an engine "B" having two, different length intake runners as disclosed herein. At low engine speed, engine torque can be maximized with a long, tuned intake manifold. However, as engine speed increases, a shorter intake runner length is optimal thus, engines such as "A" which maximize torque at low speed will see a significant drop at higher engine speed. Adding a shorter intake runner to supply intake air as the engine enters a high speed operating range can significantly flatten the torque characteristics of the engine illustrated by the engine torque curve "B", providing more consistent power delivery across the operating range.

Figure 2:
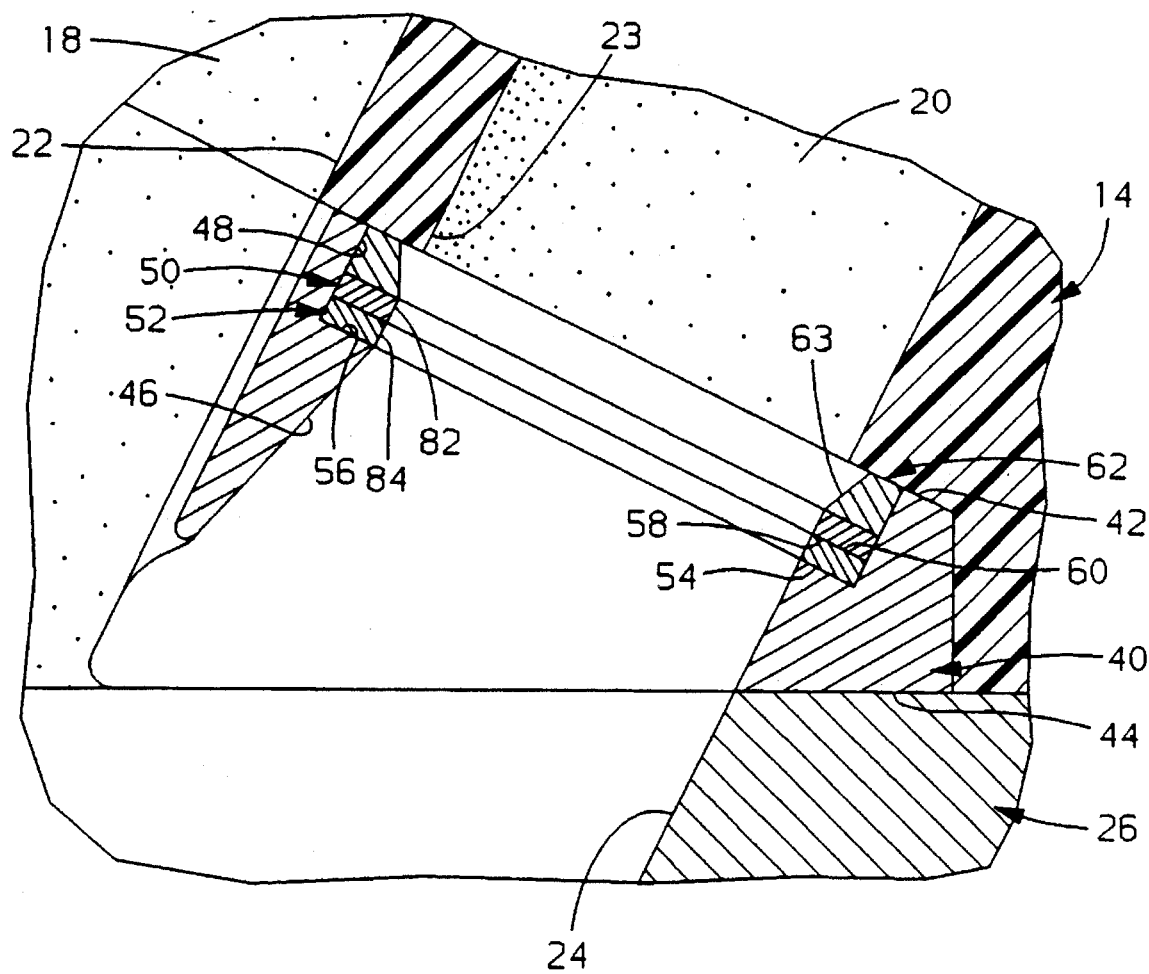
FIG. 2 is an enlarged portion of FIG. 1 showing additional detail.
Figure 3:
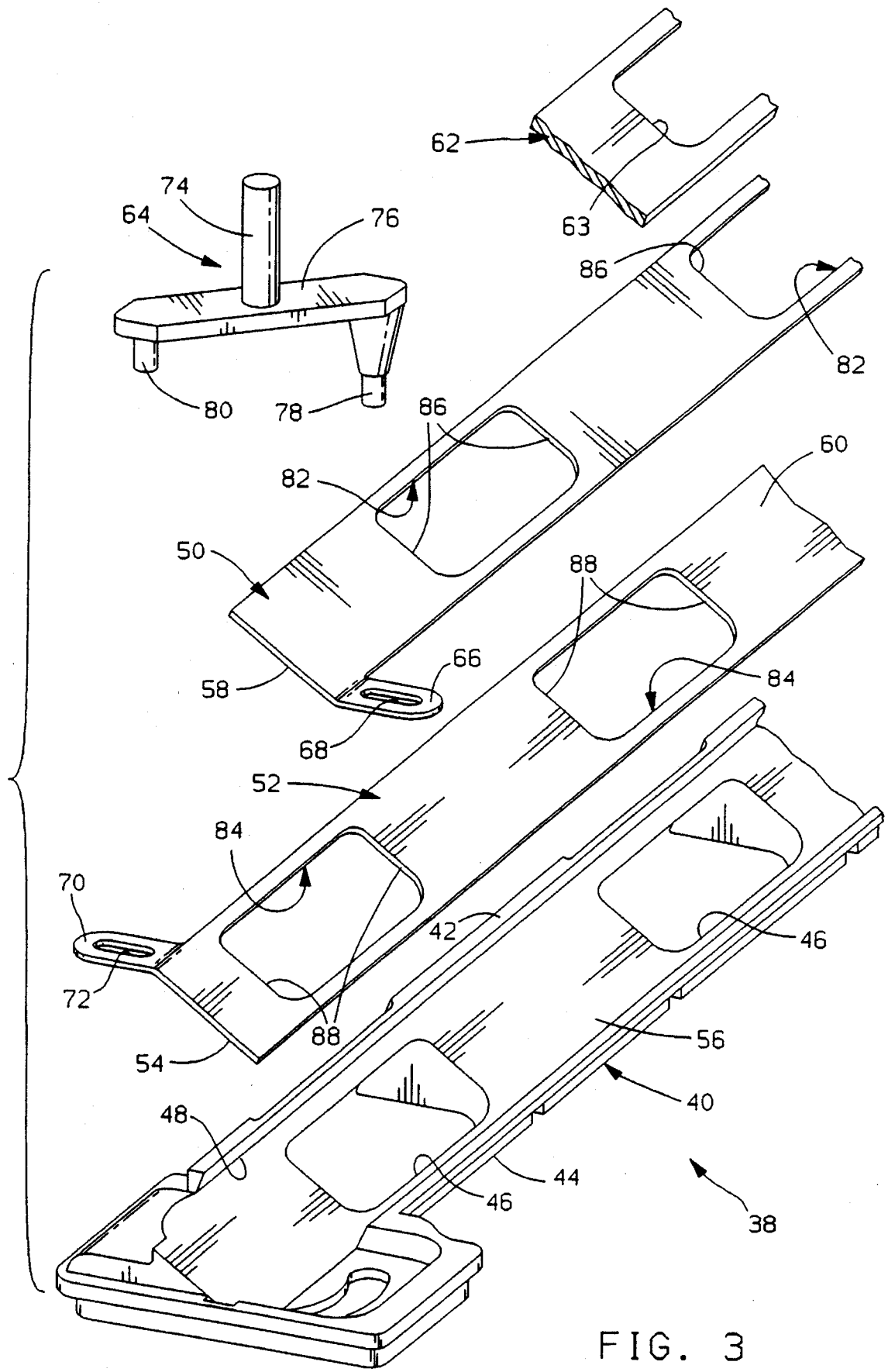
FIG. 3 is a view of a port throttle valve, with parts separated, of the present invention.

To facilitate the use of secondary, short intake runner 20 a port throttle valve, shown in FIGS. 2 and 3, is utilized to regulate flow therethrough. A slide valve 38 is configured for disposition at the interface between the intake manifold outlets 22, 23 and the cylinder head intake port 24. The slide valve 38 comprises a base member 40 which extends the length of the intake manifold/cylinder head interface and which functions as the carrier for the remainder of the valve assembly. The base member includes upper and lower surfaces 42 and 44 which may include provisions for overmoding of resilient sealing material to facilitate sealing of both the intake manifold 14 and the cylinder head 26. Longitudinally spaced apart openings 46 extend through the base member 40 from the upper to the lower surface 42,44, respectively. The openings 46 are located for registry with the outlet 23 of the short, secondary intake runner 20 and the cylinder head intake port 24. Intake air conducted through the secondary intake runners 20 will pass through the openings 46 in the valve body to converge with air from the primary runners 18 at the entrance to each intake port 24 of the cylinder head 26.

Figure 8:
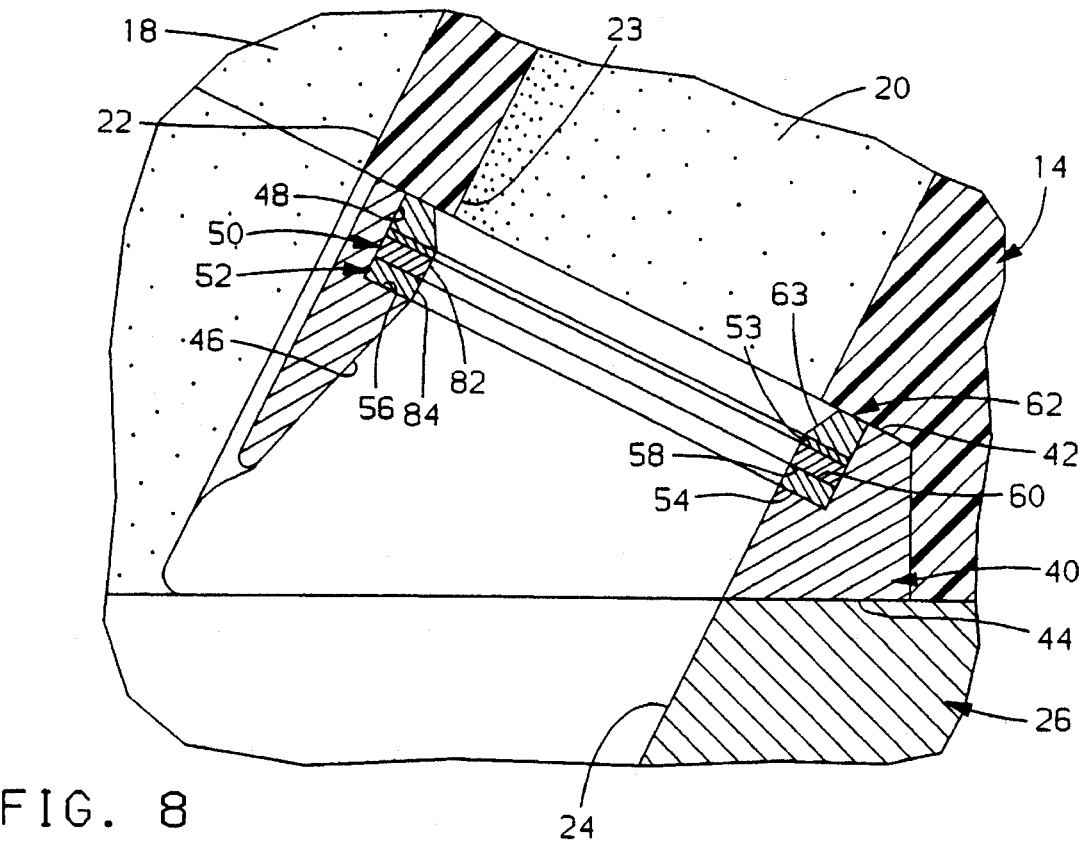
FIG. 8 is a view, similar to FIG. 2, illustrating an additional embodiment of the present invention.

The upper surface 42 of the base member 40 has a longitudinally extending, recessed slot 48 which defines a track for the placement of two sliding valve plates 50 and 52. Valve plate 52, the lower of the two plates as viewed in the Figures, lies in the recessed slot 48 such that its lower surface 54 is in sliding contact with the track surface 56. Valve plate 50 is placed atop lower valve plate 52 in recessed slot 48 such that the lower surface 58 of the valve plate 50 is in sliding contact with the upper surface 60 of valve plate 52. To assure smooth and consistent movement of the valve plates relative to the track and one another, the surfaces of the valve plates may have a low friction, lubricating surface, such as a layer of fluoropolymer, applied thereto. A cover member 62 closes the recessed slot 48 and secures the valve plates within the track. The cover member 62 includes longitudinally spaced apart openings 63 located for registry with the openings 46 in base member 40. Biasing members, such as spring 53 shown in the embodiment of FIG. 8, may be utilized to urge the valve plates 50,52 into a secure, face-to-face relationship within the track. Spring 53 is effective to minimize relative movement of the plates which may lead to leakage, noise, and disruption of air flow through the valve 38.

Actuator linkage 64 is mounted to the base member 40 at one end of the slide valve 38. Several modes of actuation are contemplated for movement of the valve plates such as a rack and pinion unit or the peg and slot construction shown in the Figures. In FIG. 3, valve plate 50 has an actuator tab 66 having an engagement slot 68 extending from one lateral edge of the valve plate. Similarly, valve plate 52 includes an actuator tab 70 having a slot 72, the tab extending from the lateral edge of valve plate 52 opposite that of tab 60 of valve plate 50. Actuator linkage 64 includes a rotatable shaft 74 having a cross arm 76 at one end thereof. The cross arm is terminated at both ends by drive pegs 78 and 80 which are configured to engage the slots 68 and 72 of the valve plate actuator tabs 66,70, respectively. Rotation of the shaft will move the valve plates longitudinally in slot 48, in opposite directions, relative to one another.

Figure 4:
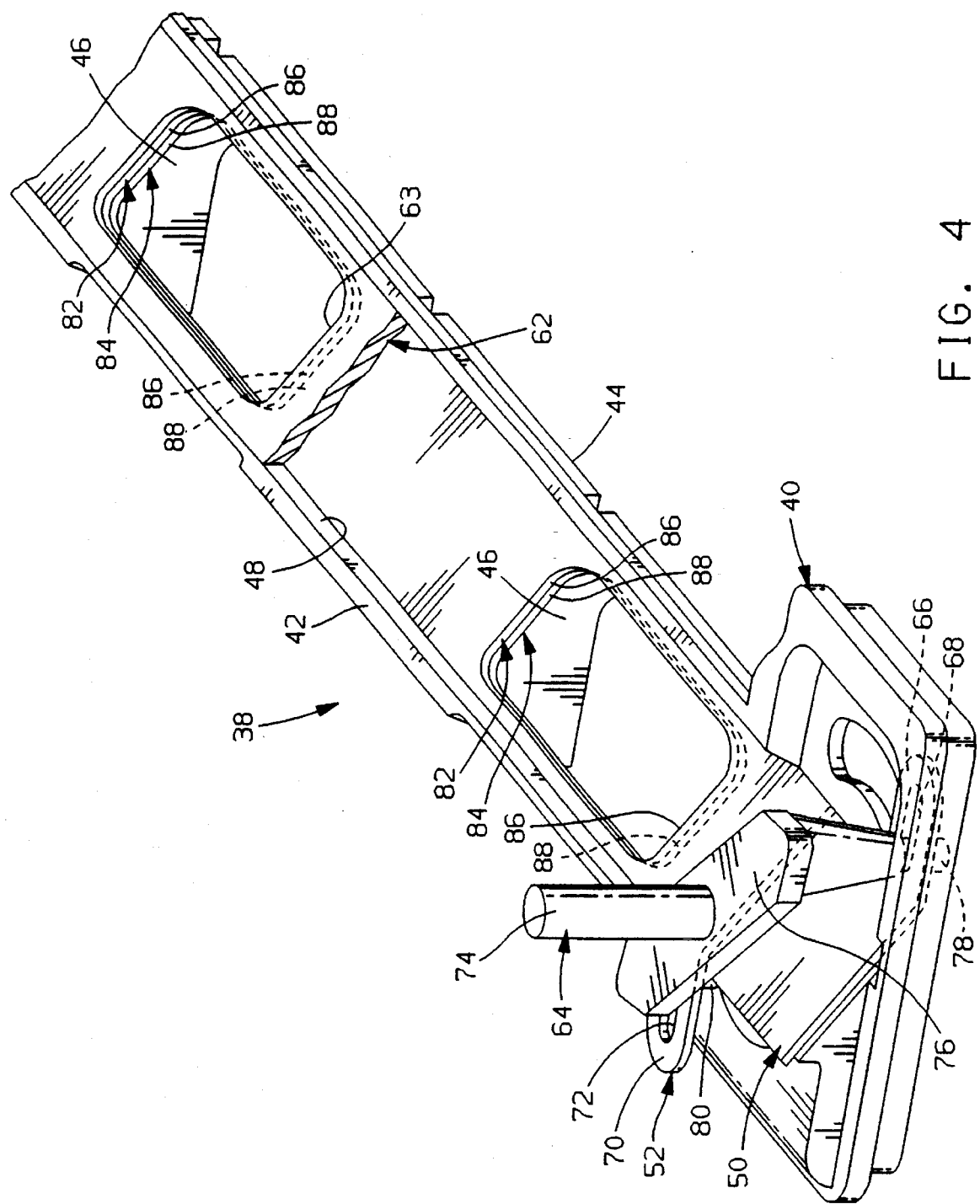
FIGS. 4, 5 and 6 are partial perspective views of the throttle valve of FIG. 4 illustrating various operational modes.
Figure 5:
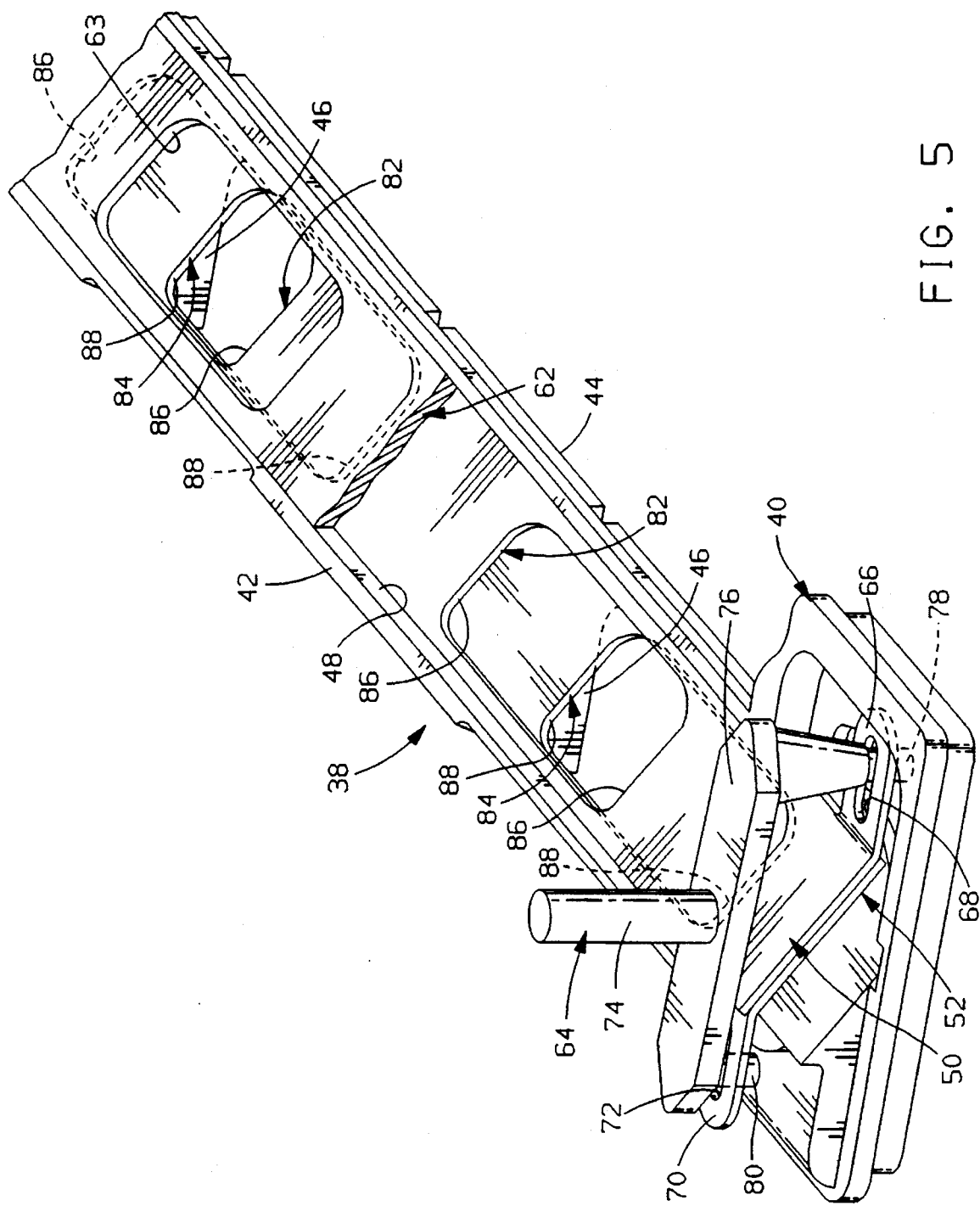
Figure 6:
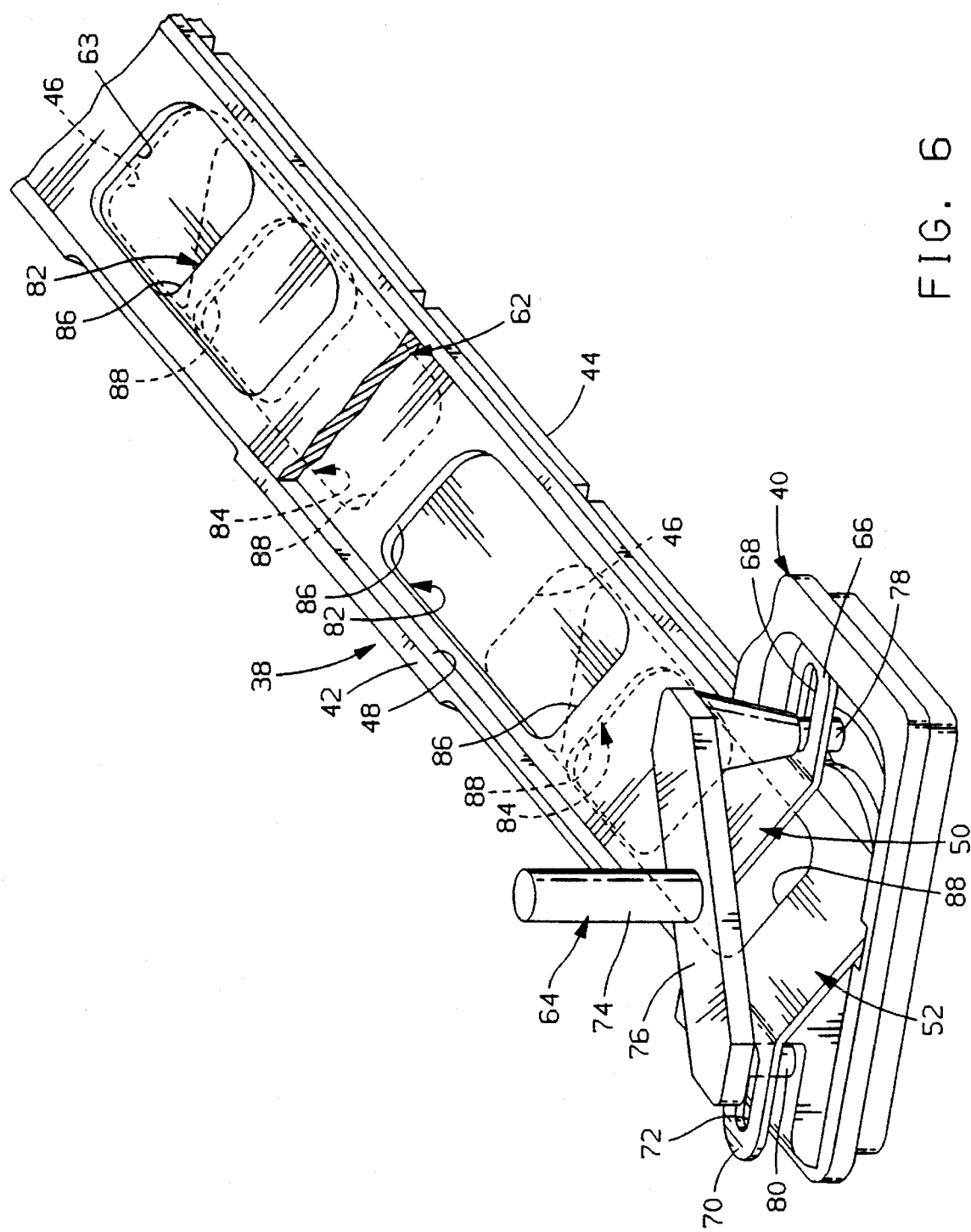

Valve plates 50 and 52 each have a series of longitudinally spaced openings 82,84, respectively, which are equivalent in size, shape and spacing to the openings 46,63 in the base member 40 and cover 62. The longitudinal position of the openings through each of the valve plates 50 and 52 varies, however, by an offset which will allow the plates to be moved, in directions opposite to one another, a longitudinal distance approaching one-half of the length of the openings 82,84 in order to fully close the openings 46, in base member 40. The operation is as follows. From a position of full registry of the valve plate openings 82 and 84 with one another and with the openings 46,63 in both the valve base member 40 and cover 62, shown in FIG. 4, the actuator linkage 64 rotates causing the engagement pegs 78,80 to impart opposite, longitudinal motion to each of the valve plates 50 and 52. As both of the valve plates move in opposite directions, the edge 86 of opening 82 of valve plate 50 and the opposite edge 88 of opening 84 of valve plate 52 begin to move towards one another, as shown in FIG. 5. When each valve plate 50,52 has been moved one-half the length of the opening 46 in the valve base member 40, the corresponding, opposite edges 86 and 88 of the valve plates 50 and 52 meet at the centerline of the opening 46, as shown in FIG. 6, to thereby fully close the opening 46 in base member 40 and opening 63 in cover 62. To open the passages 46,63 to renewed air flow, the actuator 64 reverses the rotational direction of shaft 74, resulting in a reversal of valve plate movement which causes the edges 86,88 of openings 82,84 in the valve plates 50,52 to part at the centerline of the opening 46 in the base member. As opening movement of the valve plates continues, the registry of the valve openings 82 and 84 increases until each of the openings is in complete registry with the opening 46 in the valve base member 40, the opening 63 in the cover 62, and with one another.

The use of two valve plates 50 and 52 which move in opposite directions to one another through the opening and closing operation of the valve assembly 38 results in an opening and a closing function which is focused on the centerline of the valve opening 46. The result of the centralized opening and closing is the delivery of a central airflow at all valve open positions. Such central airflow is desirable as the flow from secondary intake runner 20 is introduced into the airflow from the primary runner 18 at a location downstream of the valve assembly 38. The central airflow minimizes turbulence and swirl, which would be created in a single plate, side opening valve member, thereby assuring minimum airflow disruption through the cylinder head intake port 24 and, in particular, more consistent fueling of the intake air charge by the injector 30 which is located between the valve outlet and the cylinder inlet.

In addition to airflow and fueling benefits provided by the present invention, the design provides engine packaging benefits as well. Slide valve operation of the secondary intake runners allow the use of an over-under, or nesting configuration for the intake manifold which provides significant axial space savings. The utilization of two valve plates opening in opposed, axial directions limits the axial movement of the two plates. While not lessening the overall length of the valve assembly, the axial movement in either direction is reduced by one-half, thereby reducing the extension of the valve assembly on either end of the engine.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. A port throttle valve assembly for an intake system of an internal combustion engine comprising a base member having a top and a bottom, a recessed slot in said top defining a track, and an opening extending through said base member from track in said top to said bottom, a first valve member, slidingly disposed within said track, said first valve member having an opening extending therethrough, a second valve member, slidingly disposed within said track in adjacent relationship with said first valve member, said second valve member having an opening extending therethrough, and a cover member closing said recessed slot, said cover having an opening corresponding to said opening in said base member, said first valve member slidable in a first open direction within said recessed slot and said second valve member slidable in a second, open direction, opposite to said first open direction of said first valve member, within said recessed slot to thereby align said opening in said first valve member and said opening in said second valve member with said openings in said cover member and said base member to facilitate the passage of air through said valve assembly, and said first valve member slidable in a first closed direction within said recessed slot and said second valve member slidable in a second, closed direction, opposite to said first closed direction of said first valve member, within said recessed slot to thereby move said openings in said first and second valve members out of registry with said openings in said cover member and said base member to preclude air flow through said valve assembly, said registry of said openings in said first and second valve members with said openings in said cover member and said base member initiating and terminating at the center of the valve assembly opening.

2. A port throttle valve for an intake system of an internal combustion engine comprising a base member having a top and a bottom, a recessed slot in said top defining a track, and an opening extending though said base member from said track in said top to said bottom, a first valve plate, slidingly disposed within said track and having an opening for registry with said opening in said base member for the passage of air through said valve and a second valve plate, slidingly disposed in said track, in adjacent relationship to said first valve plate, and having an opening for registry with said opening in said first valve plate and said opening in said base member for the passage of air through said valve, said first and second valve members slidable, in opposed directions in said track such that a first edge of said opening in said first valve plate, adjacent a first longitudinal end of said opening in said base member, and a second edge of said opening in said second valve plate, adjacent a second longitudinal end of said opening in said base member, are moved towards one another to terminate said registry of said openings in said first and second valve plates centrally of said opening in said base member.

3. A port throttle valve for an intake system of an internal combustion engine, as defined in claim 2, said valve further comprising a cover member closing said recessed slot, said cover member having an opening in alignment with said opening in said base member to facilitate passage of air through said valve.

4. A port throttle valve for an intake system of an internal combustion engine, as defined in claim 3, said valve further comprising a biasing member disposed between said cover and said second valve plate and operable on said valve plates.

5. A port throttle valve for an intake system of an internal combustion engine comprising a base member having a top and a bottom, a recessed slot in said top defining a track, and an opening extending though said base member from said track in said top to said bottom, a first valve plate, slidingly disposed within said track and having an opening for registry with said opening in said base member for the passage of air through said valve and a second valve plate, slidingly disposed in said track, in adjacent relationship to said first valve plate, and having an opening for registry with said opening in said first valve plate and said opening in said base member for the passage of air through said valve, and an actuator linkage, in communication with said first and said second valve plates, and operable to slide said plates in opposed directions in said track such that a first edge of said opening in said first valve plate, adjacent a first longitudinal end of said opening in said base member, and a second edge of said opening in said second valve plate, adjacent a second longitudinal end of said opening in said base member, are moved towards one another to terminate said registry of said openings in said first and second valve plates centrally of said opening in said base member.

6. A port throttle valve for an intake system of an internal combustion engine, as defined in claim 5, said valve further comprising a first actuator tab extending from a first lateral edge of said first valve plate and a second engagement slot extending from a second lateral edge of said second valve plate, said slots configured to engage first and second drive pegs of said actuator linkage such that rotation of said linkage is operable to move said first valve plate in said first longitudinal direction and to move said second valve plate in said opposite longitudinal direction in said slot.

7. An intake system for an internal combustion engine comprising an intake manifold having an air inlet in communication with an inlet port of said engine through first and second intake runners, and a valve, disposed between said second intake runner, comprising a base member having a top and a bottom, a recessed slot in said top defining a track, and an opening extending though said base member from said track in said top to said bottom, a first valve plate, slidingly disposed within said track and having an opening for registry with said opening in said base member for the passage of air from said second intake runner through said valve and a second valve plate, slidingly disposed in said track, in adjacent relationship to said first valve plate, and having an opening for registry with said opening in said first valve plate and said opening in said base member for the passage of air through said valve, said first and second valve members slidable, in opposed directions in said track such that a first edge of said opening in said first valve plate, adjacent a first longitudinal end of said opening in said base member, and a second edge of said opening in said second valve plate, adjacent a second longitudinal end of said opening in said base member, are moved towards one another to terminate said registry of said openings in said first and second valve plates centrally of said opening in said base member to terminate the flow of air from said inlet to said intake port of said engine through said second intake runner.

* * * * *